July 3, 1951
A. W. VANCE
2,559,525
CATHODE-RAY DEFLECTION CIRCUITS
Filed Dec. 31, 1949
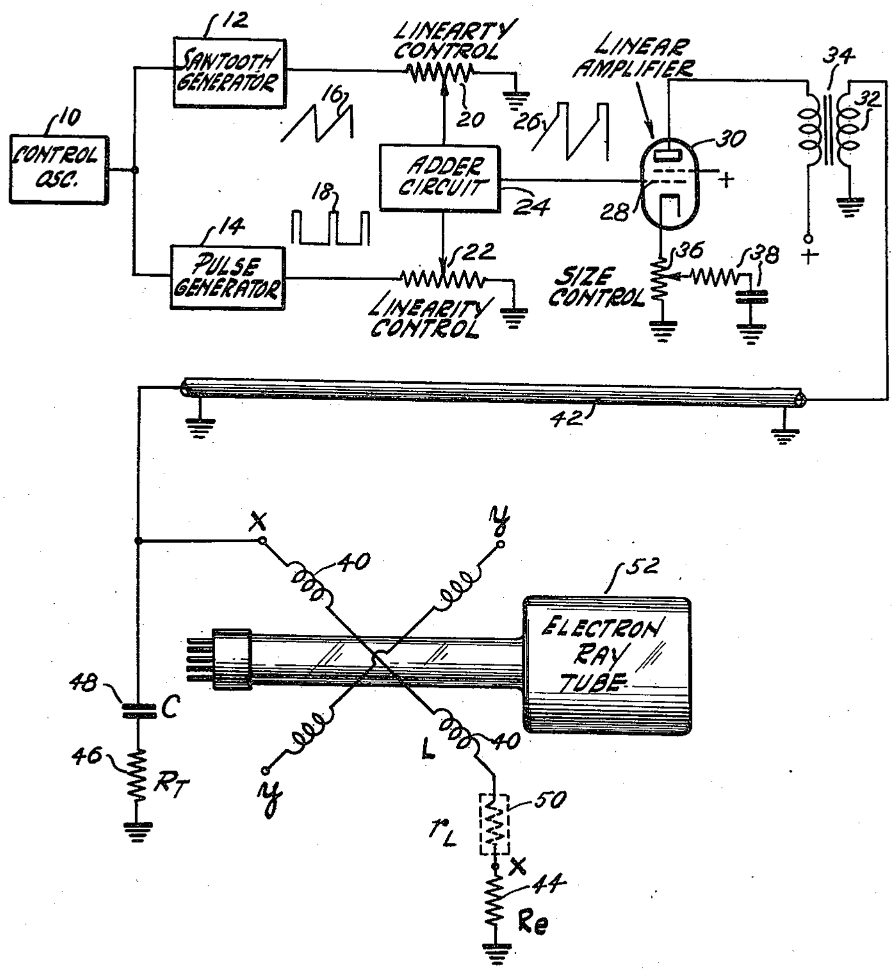
Inventor
ARTHUR W. VANCE
By [signature]
Attorney Patented July 3, 1951

2,559,525

UNITED STATES PATENT OFFICE 2,559,525

CATHODE-RAY DEFLECTION CIRCUITS

Arthur W. Vance, Cranbury, N. J., assignor to Radio Corporation of America, a corporation of Delaware Application December 31, 1949, Serial No. 136,236

3 Claims. (Cl. 315—27)

The present invention relates to cathode ray beam deflection circuits and more particularly, although not necessarily exclusively to television type deflection apparatus employing electromagnetic electron ray beam deflection.

In even more particularity, the present invention relates to improvements in electromagnetic cathode ray beam deflection circuits of a type employing sawtooth deflection current waveforms such, for example, as utilized in present-day television camera apparatus.

There often arises in the television art, the need for communicating over a considerable distance substantial amounts of cathode ray beam deflection power. For example, in television camera apparatus, it is highly desirable to minimize the complexity of the electronic circuits physically associated with the camera or image pick-up tube. In order to achieve the desired degree of simplicity, it is convenient to develop the necessary beam deflection power for the image pick-up tube at a point remote from the television camera and by means of coaxial cables or the like communicate the remotely generated deflection signal to the deflection yoke of the television camera tube.

Inasmuch, however, as the deflection waveform is generally of a sawtooth formation representing a number of harmonically related frequency components, extreme care must be exercised in selecting characteristics of the signal translating means between the remotely located deflection generator and the camera deflection yoke. Since the deflection yoke itself reflects a highly reactive impedance at commonly employed deflection frequencies, especially at the standard 15,750 C. P. S. horizontal line deflection rate, a rather severe transmission line problem is presented which, if not properly solved, will result in intolerable distortion of the sawtooth current waveform, which it is desired to produce through the deflection yoke.

Moreover, in such television camera deflection arrangements, as well as electromagnetic horizontal deflection circuits found in most any present-day television apparatus, means are generally required for damping the deflection yoke in order to prevent excessive oscillatory ringing of the deflection yoke during the transient periods initiated by the return portion of the sawtooth deflection waveform. This damping is usually provided by an electron discharge tube connected in shunt with the horizontal deflection yoke in series through a suitable damping resistor. However, the excessively high amplitude transients developed in such a damping circuit give rise to stray pick up in adjacent circuits as wall as requiring the expense and bulk of an additional electron discharge tube. It is evident that both of these latter disadvantages are particularly objectionable in television camera equipment where extremely low level video amplifier stages are employed and wherein, as stated above, it is desirable to minimize the number of required circuits components.

It is therefore an object of the present invention to provide an improved novel signal communicating system for electrical waveforms used in the electromagnetic electron ray beam deflection circuits.

It is another object of the present invention to provide a simple and economical electromagnetic beam deflection system for use in television systems and the like in which high level generation of beam deflection power may be advantageously accomplished at a point remote from the actual electromagnetic beam deflection yoke.

A still further object of the present invention resides in the provision of a simple and economical deflection signal distribution system especially suited for use in connection with television camera equipments in which it is desired to minimize the expense and bulk of equipment necessarily associated with the complete camera mechanism.

It is a still further object of the present invention to provide an improved utilization system for electromagnetic beam deflection signals such that the common electromagnetic deflection yoke may be connected with a source of deflection signal energy through a simple co-axial or other connecting cable of an indefinite length without producing serious waveform distortion.

Still another object of the present invention resides in the provision of a standard frequency horizontal line electromagnetic deflection system utilizing a common electromagnetic deflection yoke in such a way that the need of a special damping device for the deflection yoke is eliminated.

In the realization of the above objects and features of advantage, the present invention contemplates the use of a standard electromagnetic deflection yoke connected in series with a first corrective resistor to form a combination. Across this combination there is applied a second series combination of a capacitor and resistance. The resistance of the second series combination and the total resistance of the first series combination (including the resistance of the deflection yoke) are made equal and may be represented by the letter R. The value of the capacitor of the second series combination may then be found in terms of the deflection yoke inductance and the resistance value R according to the following equation:

$$C=\frac{L}{R^2}$$

With this expression satisfied, the terminal impedance of the deflection yoke system appears as a pure resistance at all signal frequencies and hence the deflection yoke may receive its drive through a simple co-axial cable extending from a remotely located deflection generator.

A more complete understanding of the operational mode of the present invention, as well as other objects and features of advantages thereof, may be obtained by reference to the following description, especially when taken in connection with the single figure of the drawing which shows, by a combination block diagram and schematic representation, one embodiment of the present invention.

Turning to the drawing, there is illustrated by the block 10 any convenient form of control oscillator capable of producing a timing signal at its output. This oscillator may take any number of forms well known to those skilled in the art, such as a relaxation oscillator, a multivibrator, a sine wave oscillator, etc. The output of the control oscillator 10 is then utilized to synchronize a conventional sawtooth generator 12 and ordinary pulse generator 14, the wave forms of whose outputs are respectively represented by the curves 16 and 18. The output of the sawtooth and pulse generators 12 and 14 are respectively terminated by some attenuating means such as potentiometers 20 and 22, the adjustable take-off arms of which are connected to the input of an adder circuit 24. The adder circuit 24 merely combines the sawtooth component 16 with the pulse component 18 to form a composite deflection signal 26 which is applied to the control electrode 28 of the discharge tube 30.

The discharge tube 30, in accordance with the present invention, is adapted for operation as a substantially linear amplifier so that the waveform developed across the secondary 32 of the output transformer 34 is virtually the same as the waveform 26. The amplitude of the amplifier output may be adjusted by controlling the degeneration in the cathode circuit of the discharge tube 30 as, for example, provided by potentiometer 36 and resistive-capacitive network 38.

In further accord with the present invention, the low impedance output of the linear amplifier available across the secondary winding 32 may be applied to the deflection yoke winding X—X at 40, via any convenient transmission medium such as, for example, a low impedance co-axial cable 42. However, in order to simplify the problem of properly terminating the transmission line or co-axial cable, as stated above, a resistance 44 of value $R_e$ is placed in series with the deflection yoke winding 40 and a resistance-capacitor combination 46 and 48, of respective values $R_t$ and C, is placed in shunt with the combination formed by the resistance 44 and winding 40. The resistance element $r_L$ embraced by the dotted line area 50 illustrates the effective resistance of the yoke winding 40 itself. The inductance of the yoke winding 40 is appropriately represented by the symbol L.

Thus, according to the present invention, when $$R_t=r_L+R_e=\sqrt{\frac{L}{C}}$$

the impedance terminating the transmission line 42 appears resistive at all signal frequencies and hence no awkward reactive components are presented. In applications of the present invention to systems employing output amplifiers having a specific terminal output impedance $R_0$, it is found convenient to allow $R_t=R_0=R_e+r_L$ and the surge impedance of the transmission line 42 made equal to $R_0$.

Since in many applications the resistive component $R_e$ at 44 placed in series with the deflection yoke 40 will be rather significant compared to the inductive reactance of the inductive component L of the yoke winding at representative signal frequencies, it is important to compensate the waveform of voltage applied across the inductance for the effect that this series resistance has on the yoke current waveform. In the figure, where there is illustrated a typical television type of deflection circuit requiring a sawtooth of current through the deflection yoke winding 40, the resistive component $R_e$ is corrected by adding a pulse component to the sawtooth waveform 16. By varying the ratio of the sawtooth component to pulse component by means of potentiometers 20 and 22, any degree of correction for the series resistance $R_e$ may be obtained. The size of the raster produced by the deflected electron beam in the electron ray tube 52 may, of course, as noted above, be controlled by the degenerative gain control arrangement in the cathode circuit of the linear amplifier discharge tube 30.

Although the present invention has been illustrated in particularity with respect to a sawtooth type of deflection waveform, it is apparent that its utility is in no way limited thereto. The purely resistive nature of the transmission line loading, made possible by the present invention, makes overall performance substantially independent of waveform. However, it is obvious that the use of other waveforms would entail the use of a different compensating technique for the resistive component $R_e$ at 44. Furthermore, the use of the linear amplifier 30 is optional depending upon the power available at the output of the adder circuit 24. In many instances, it is quite possible to develop in a single stage a composite waveform for application to the co-axial line 42 which has just those waveform characteristics necessary to produce the desired current waveform through the deflection yoke 40. In such cases, the use of the adder circuit and separate sawtooth and pulse generator arrangements, per se, will not be required.

It is further apparent that since the termination of the co-axial line 42 is purely resistive, the length of the transmission line or co-axial cable is of no particular consequence except as to the normal attenuation of signal amplitude produced by the losses of such transmission media. This feature makes the present invention particularly valuable in television pick-up systems where, as noted hereinabove, the camera may be operated at a point remote from the deflection signal generator.

What is claimed is:

1. In a cathode ray beam deflecting circuit including a source of deflection voltage embracing a predetermined range of signal frequency components and an electromagnetic deflection yoke winding having an inductance component L and resistance component $r_L$, a signal communicating circuit having substantially linear amplitude and frequency response characteristic over the range of deflection signal frequency components, means for applying deflection voltage to the input of said signal communicating circuit, a first resistor of value $R_e$ connected in series with said deflection yoke to form a combination, connections for applying the output of said signal communicating circuit across said resistor-yoke combination, and a capacitor of value C and second resistor of value $R_T$ connected to form a series combination in shunt with said resistor-yoke combination wherein the following relations are substantially fulfilled $$R_e+r_L=R_T=\sqrt{L/C}$$

2. In an electromagnetic cathode ray beam deflection system including an electromagnetic deflection yoke winding having an inductive component L and an effective series resistive component $r_L$ said system also including a source of deflection waveform embracing a plurality of signal frequencies, the combination of means for applying said deflection waveform across said deflection yoke winding, a capacitor of value C, a resistor of value $r_L$, connections placing said resistance and capacitance in series to form a combination in shunt with said deflection yoke winding wherein the value of C is made substantially equal to $$C=\frac{L}{r_L^2}$$

3. In an electromagnetic cathode ray beam deflection system including an electromagnetic deflection yoke winding having an inductive component L and an effecting series resistive component $r_L$, said system also including a source of deflection waveform embracing a plurality of signal frequencies, the combination of, a substantially linear amplifier adapted to receive and faithfully communicate said deflection waveform to a pair of amplifier output terminals designated for a substantially resistive loading of value $R_T$, a first resistor of value $R_e$ connected in series with said deflection yoke to form a combination in which the value $R_e$ is substantially expressed by $R_e=R_T-r_L$, connections placing said combination in shunt with said amplifier output terminals, and a series resistance-capacitance combination of resistance value $R_c$ and capacitance value C connected in shunt with said resistor-yoke combination, the values of said resistance and capacitance being substantially expressed by $$R_c=R_T$$
$$C=L/R_T^2$$

ARTHUR W. VANCE.

REFERENCES CITED

The following references are of record in the file of this patent:

UNITED STATES PATENTS

| Number | Name | Date |
|---|---|---|
| 2,489,374 | Haantjes et al. | Nov. 29, 1949 |
| 2,489,375 | Haantjes et al. | Nov. 29, 1949 |